US011678674B1

(12) United States Patent
Taylor et al.

(10) Patent No.: US 11,678,674 B1
(45) Date of Patent: Jun. 20, 2023

(54) PATTY FORMING MACHINE FOR FORMING HEATED FOOD PATTIES

(71) Applicant: Provisur Technologies, Inc., Chicago, IL (US)

(72) Inventors: Paul Taylor, Munster, IN (US); Richard James Cygan, Tinley Park, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 353 days.

(21) Appl. No.: 17/012,292

(22) Filed: Sep. 4, 2020

Related U.S. Application Data

(60) Provisional application No. 62/895,582, filed on Sep. 4, 2019.

(51) Int. Cl.
*A22C 7/00* (2006.01)
*A23P 30/10* (2016.01)
*A47J 37/06* (2006.01)

(52) U.S. Cl.
CPC .......... *A22C 7/0076* (2013.01); *A23P 30/10* (2016.08); *A47J 37/06* (2013.01)

(58) Field of Classification Search
CPC ..... A22C 7/003; A22C 7/0038; A22C 7/0076; A23P 30/10; A47J 37/06; A47J 37/0611; A47J 37/0629; A47J 37/0647; A47J 37/067

USPC ......................................................... 425/574
See application file for complete search history.

(56) References Cited

U.S. PATENT DOCUMENTS

| 7,255,554 B2 | 8/2007 | Lamartino et al. |
| 10,306,913 B2 | 6/2019 | Seemann et al. |
| 2019/0059645 A1* | 2/2019 | Nelson .................. A47J 37/044 |
| 2019/0082703 A1* | 3/2019 | Bearson .................. A23L 13/67 |

FOREIGN PATENT DOCUMENTS

WO      2017/151163 A1      9/2017

\* cited by examiner

*Primary Examiner* — Yunju Kim
(74) *Attorney, Agent, or Firm* — Klintworth & Rozenblat IP LLP

(57) ABSTRACT

A patty forming machine for forming heated food patties includes a plurality of mold plates connected together to form an endless loop and driven for circulation around the loop. Each mold plate has a cavity having open top and bottom ends. A manifold is above a lower run of the loop and supplies moldable food material to the cavity of the mold plates. A breather plate is positioned below the lower run and below the manifold. Upper and lower ovens are positioned downstream of the manifold and above and below a lower run of the loop. A knockout mechanism is mounted downstream of the upper oven. A lower heater plate may be positioned below and extend along a substantial portion of the lower run for supporting the food material in the mold plates traverse along the lower run. A wash station cleans the mold plates.

14 Claims, 13 Drawing Sheets

PATTY FORMING MACHINE FOR FORMING HEATED FOOD PATTIES

CROSS-REFERENCE TO RELATED APPLICATION

This application claims the priority of U.S. provisional application Ser. No. 62/895,582, filed on Sep. 4, 2019, the contents of which are incorporated herein in its entirety.

FIELD OF THE DISCLOSURE

The present disclosure relates to a patty forming machine which forms food material into food patties, heats the food patties and discharges the food patties.

BACKGROUND

Food patties of various kinds, including hamburgers, molded steaks, chicken patties, pork patties, potato patties, and others, are frequently formed in high-volume automated molding machines, and are cooked for consumption. An example of such a machine is provided in WO 2017/151163. In an embodiment, WO 2017/151163 provides an in-line system which takes food material, forms the food material into food patties, pre-cooks the food patties, and cooks the food patties to a desired temperature. WO 2017/151163 provides a first infrared oven that precooks/sears the food patties in the patty form molds from the top as the food patties are conveyed thereunder along a first conveyor. Sufficient heat is applied to patties to sear the surface of the food patties, and during this process product fat melts, which assists with patty release. After the food patties are heated by the first infrared oven, the partially precooked patties are rotated around the end of the first conveyor to flip over, and fall onto a second conveyor such that the bottom of the food patties are flipped up to be conveyed by the second conveyor through a second infrared oven and a third infrared oven. The second and third infrared ovens then precook/sear the second side of the meat patties from above. The use of the first infrared oven to cook/sear a first side along with the second and third infrared ovens to cook/sear the second side provides even browning on both sides of the patties. In another embodiment, WO 2017/151163 provides a system which has an upper infrared oven and a lower infrared oven which precook/sear both sides of the food patties. By precooking/searing each side of the patty, a skin including denatured protein is formed on at least a portion of each side. After precooking/searing the patties, the patties are fully cooked in an oven which may be an impingement oven or other type of oven, heat application device, a water bath, or oil bath (fry), for example. The oven cooks the patties to a high temperature (e.g., 150-180° F., and in some cases any temperature over 165° F.) such that the meat patties have been fully cooked and are appropriate for human consumption.

SUMMARY

A patty forming machine for forming heated food patties includes a plurality of mold plates connected together to form an endless loop and driven for circulation around the loop. Each mold plate has a cavity having open top and bottom ends. A manifold is above a lower run of the loop and supplies moldable food material to the cavity of the mold plates. A breather plate is positioned below the lower run and below the manifold. Upper and lower ovens are positioned downstream of the manifold and above and below a lower run of the loop. A knockout mechanism is mounted downstream of the upper oven. A lower heater plate may be positioned below and extend along a substantial portion of the lower run for supporting the food material in the mold plates traverse along the lower run. A wash station cleans the mold plates.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
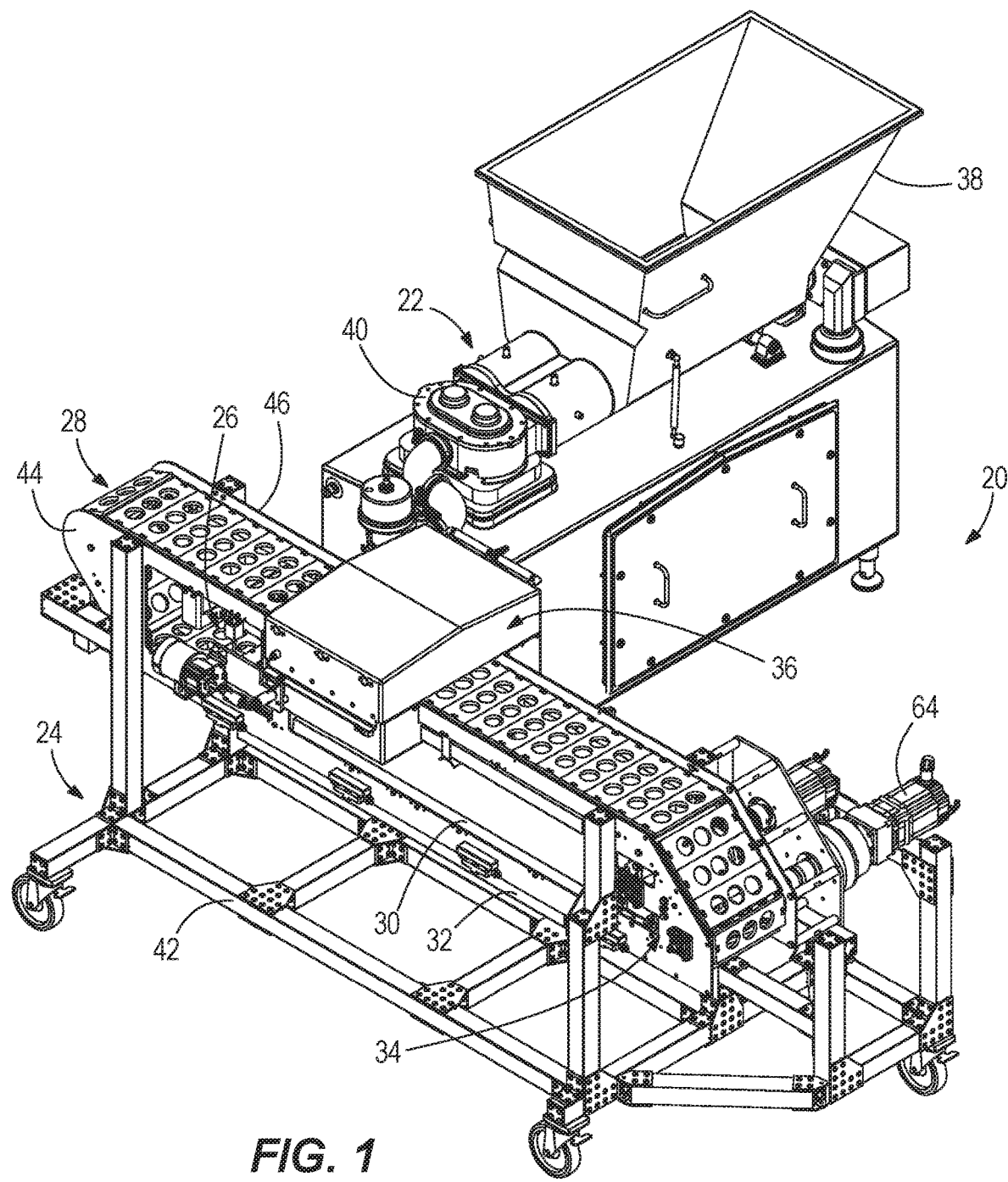
FIG. 1 depicts a rear perspective view of a patty forming machine.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
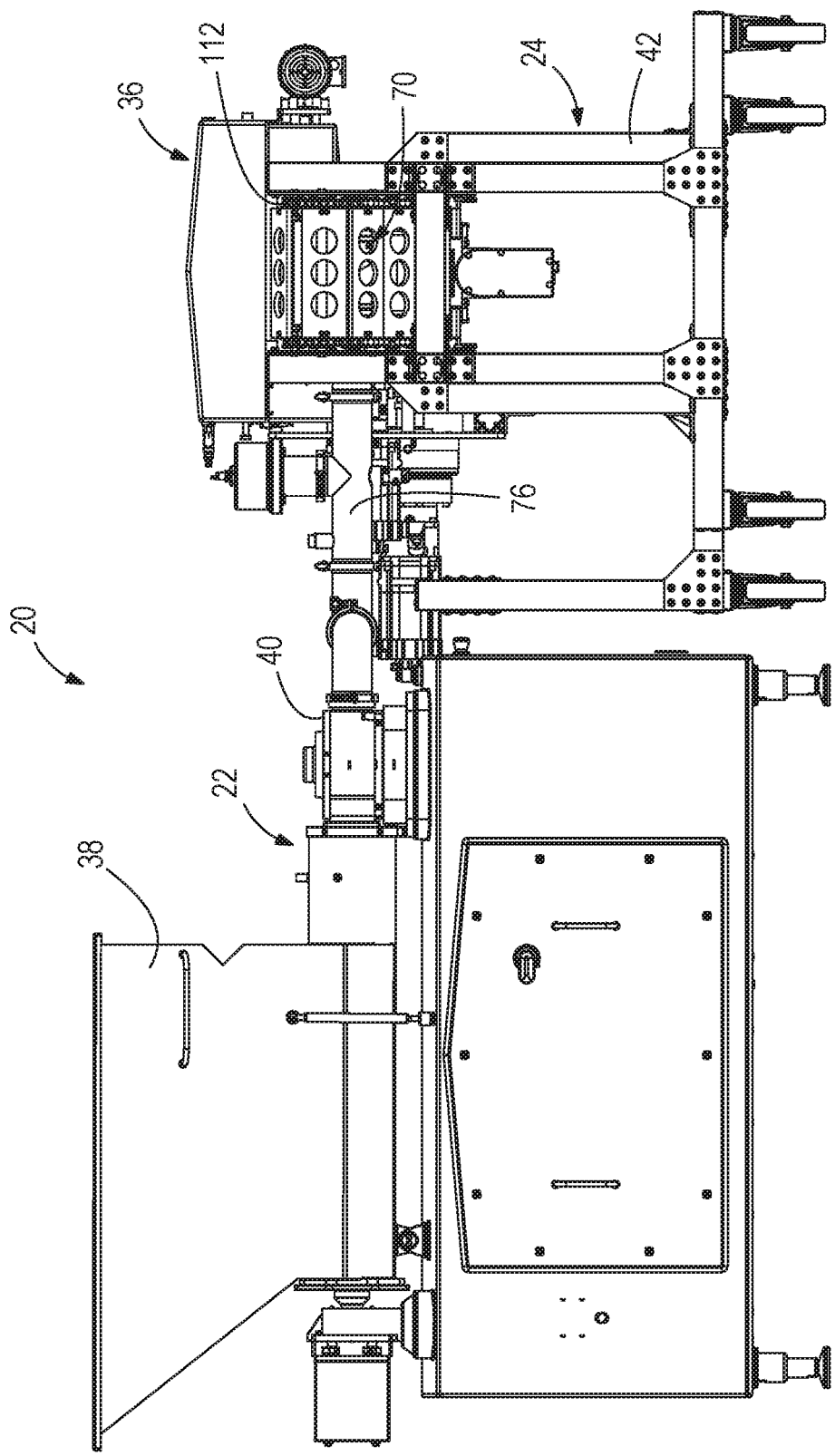
FIG. 2 depicts a front elevation view of the patty forming machine.

FIGS. 1 and 2 illustrate a patty forming machine 20 which forms heated food patties from food material. The patty forming machine 20 includes a hopper and pump assembly 22 for supplying moldable food material, such as pork, poultry, sausage, beef or the like, a frame 24 for mounting the assemblies and mechanism used to form the heated food patties, a fill assembly 26 mounted on the frame 24 for receiving food material from the hopper and pump assembly 22, a patty molding and transport assembly 28 mounted on the frame 24 for receiving food material from the fill assembly 26 and for forming food patties from the food material and for transporting the food patties, at least one upper oven 30 mounted on the frame 24 downstream of the fill assembly 26, at least one lower oven 32 mounted on the frame 24 downstream of the fill assembly 26, a knockout mechanism 34 mounted on the frame 24 downstream of the ovens 30, 32, and a wash station 36 downstream of the knockout mechanism 34. The operation of the patty forming machine 20 is controlled by machine control. A control panel, such as a touch screen control panel, may be provided on the frame.

The hopper and pump assembly 22 includes a hopper 38 into which a supply of food material is deposited from overhead, an auger at the bottom of the hopper 38 for moving the food material longitudinally along the hopper 38, a food pump system 40 which receives the food material from the auger and pumps the food material to the fill assembly 26. The food pump system 40 includes at least one food pump, that continuously, or intermittently under a pre-selected control scheme controlled by a machine control, pumps food material under pressure into the fill assembly 26.

The frame 24 includes a machine base 42 which support a pair of spaced apart upright frame plates 44, 46. The machine base 42 may be formed of a plurality of interconnected strut members. The machine base 42 is optionally mounted upon a plurality of feet, rollers or wheels.

Figure 5:
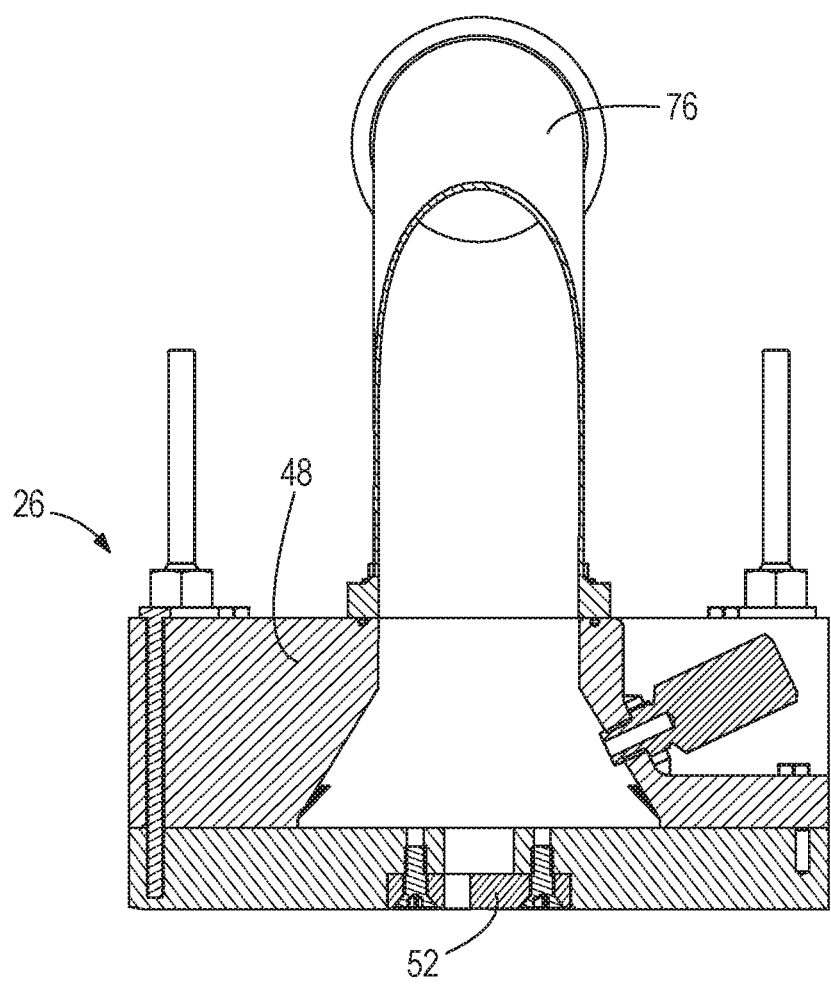
FIG. 5 depicts a cross-sectional view showing components of a fill assembly of the patty forming machine.

The fill assembly 26, see FIG. 5, includes a manifold 48 flow connected to the hopper and pump assembly 22 for receiving the pumped food material from the hopper 38 and a fill plate 52. The manifold 48 feeds the food material, still under relatively high pressure, through the fill plate 52, such as that, for example, disclosed in U.S. Pat. No. 10,306,913 which disclosure is incorporated herein by reference, and into the patty molding and transport assembly 28. Other known fill plates may be used. A driven reciprocating stripper plate, such as that for example disclosed in U.S. Pat. No. 10,306,913, may also be provided between the manifold 48 and the fill plate 52, and movable between a fill position and a cutting position.

The patty molding and transport assembly 28 includes a plurality of mold plates 54 which are connected to each other by driven endless belts 56 to form an endless loop of mold plates 54. The driven endless belts 56 may be connected chain links 58 connected to each side of each mold plate 54 which are supported by a plurality of shaft mounted gears 60. The shaft mounted gears 60 are connected at their ends to the upright frame plates 44, 46. The gears 60 are spaced apart from each other such that a cavity 62 is formed by the mold plates 54 and the upright frame plates 44, 46. One of the gears 60 is driven by a suitable motor 64 to cause the connected chain links 58, and thus the mold plates 54, to rotate along the endless loop. The endless belts 56 forms a horizontal upper run 66 and a horizontal lower run 68 which are connected together at their front ends by an upright front end run 70 and which are connected together at their rear ends by an upright rear end run 72.

Figure 6:
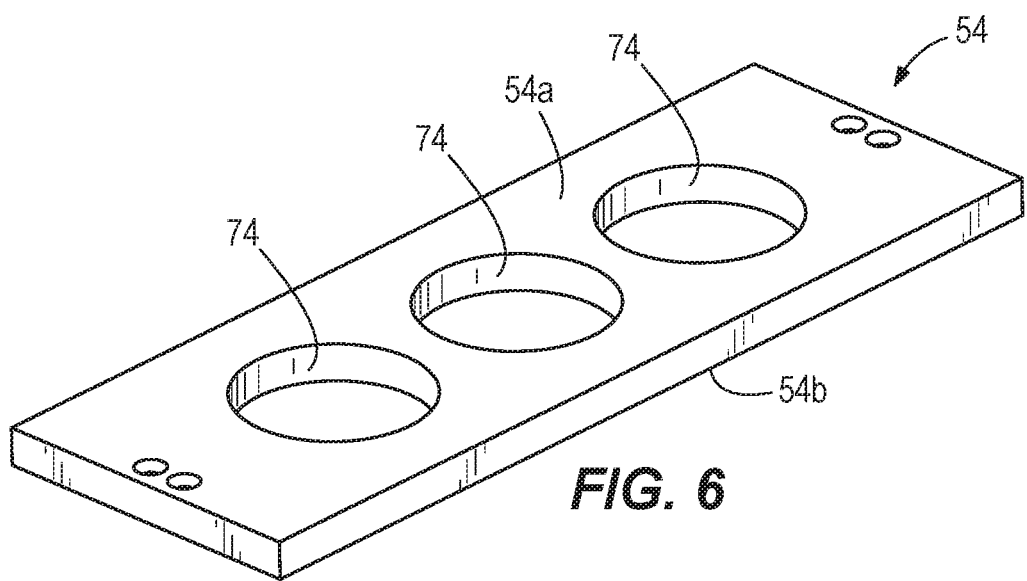
FIG. 6 depicts a perspective view of a mold plate of the patty forming machine.

As shown in FIG. 6, each mold plate 54 has a planar upper surface 54a, a planar lower surface 54b, and has a plurality of mold cavities 74 which extend therebetween. In an embodiment, the mold cavities 74 are formed in a row. As shown, three mold cavities 74 are provided in each mold plate 54, however, more or fewer mold cavities 74 may be provided.

An input pipe 76 of the food pump system 40 extends into the cavity 62. As shown, the input pipe 76 passes through the frame 24 on the side of the frame plate 46. The manifold 48 is flow connected to the input pipe 76 and is mounted within the cavity 62 such that the manifold 48 is proximate to the front end run 70 and between the upper run 66 and the lower run 68. The fill plate 52 is directly above the upper surfaces 54a of the mold plates 54 in the bottom run 68, such that when an individual mold plate 54 is below the fill plate 52, food material is pumped into the mold cavities 74.

Figure 7:
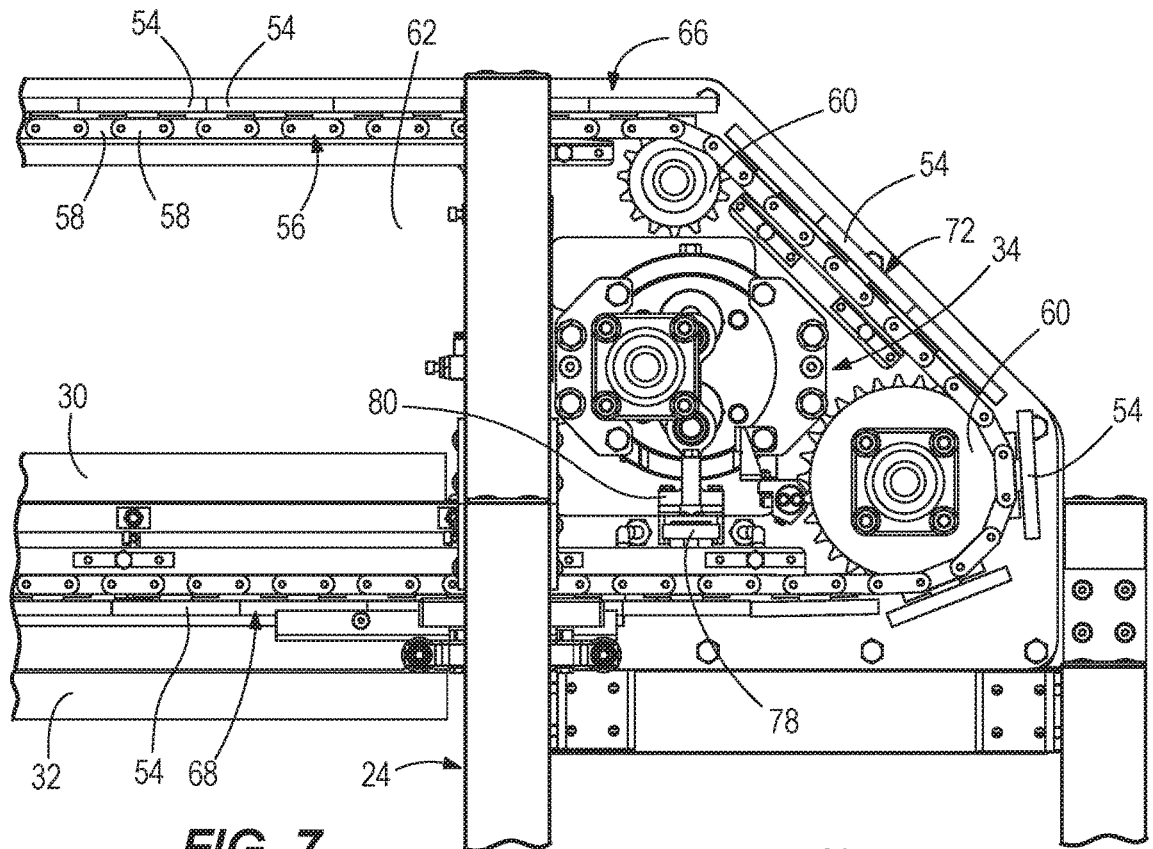
FIGS. 7 and 8 depict partial side elevation views of the rear end of the patty forming machine with the frame plate removed.
Figure 8:
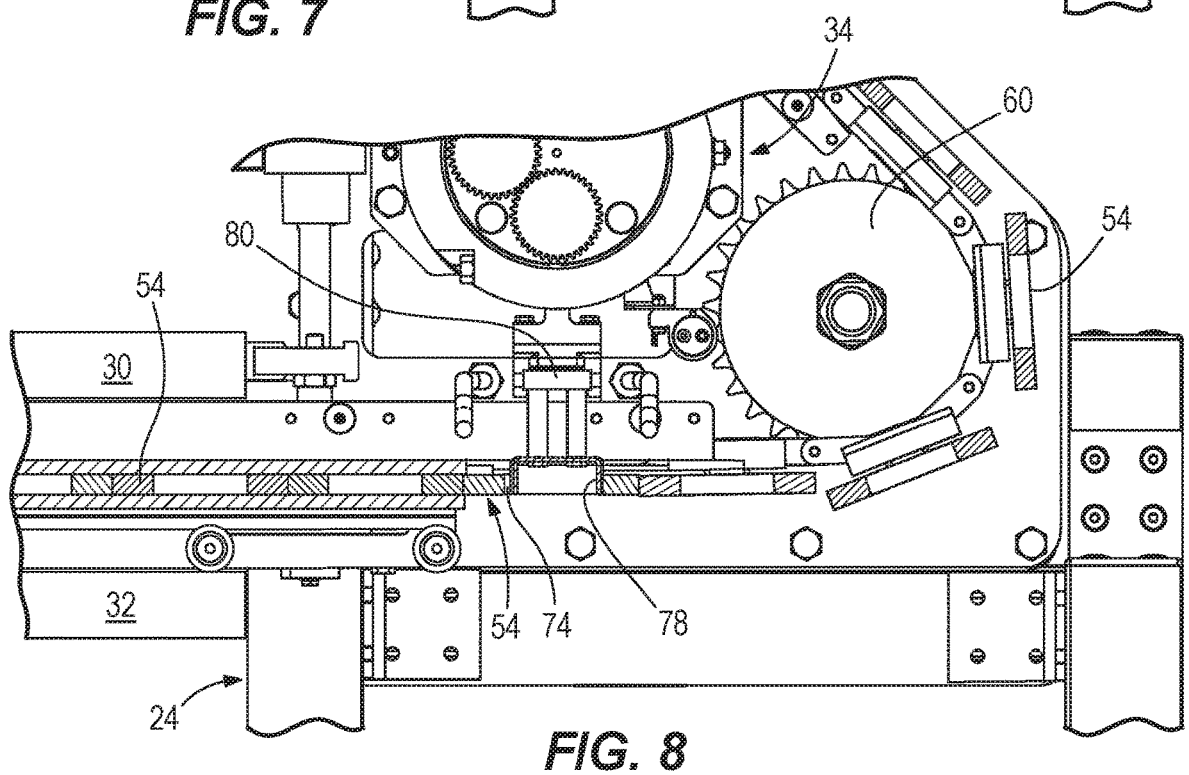

The knockout mechanism 34, see FIGS. 7 and 8, is mounted within the cavity 62 such that the knockout mechanism 34 is proximate to the rear end run 72 and between the upper run 66 and the lower run 68. In one example, the knockout mechanism 34 may be that which is disclosed in U.S. Pat. No. 7,255,554 which is incorporated by reference to the extent not inconsistent with the description provided here. The knockout mechanism 34 includes knockout plungers or cups 78 (only one of which is shown), which are fixed to a carrier bar 80. Knockout plungers or cups 78 are coordinated in number and size to the mold cavities 74 in the individual mold plates 54. One knockout plunger or cup 78 is aligned with each mold cavity 74. In an embodiment, and as shown, the mold cavities 74 are sized to be greater than the size of an individual knockout plunger or cup 78 so that the knockout plunger or cup 78 passes through the respective mold cavities 74 to knockout the food material from the mold cavities 74. In another embodiment, the mold cavities 74 are sized to be smaller than the size of an individual knockout plunger or cup 78 so that the knockout plunger or cup 78 engages with the upper surface 54a of the mold plate 54 to knockout the food material from the mold cavities 74. The knockout mechanism 34 is configured to drive the carrier bar 80 in timed vertical reciprocation.

Figure 9:
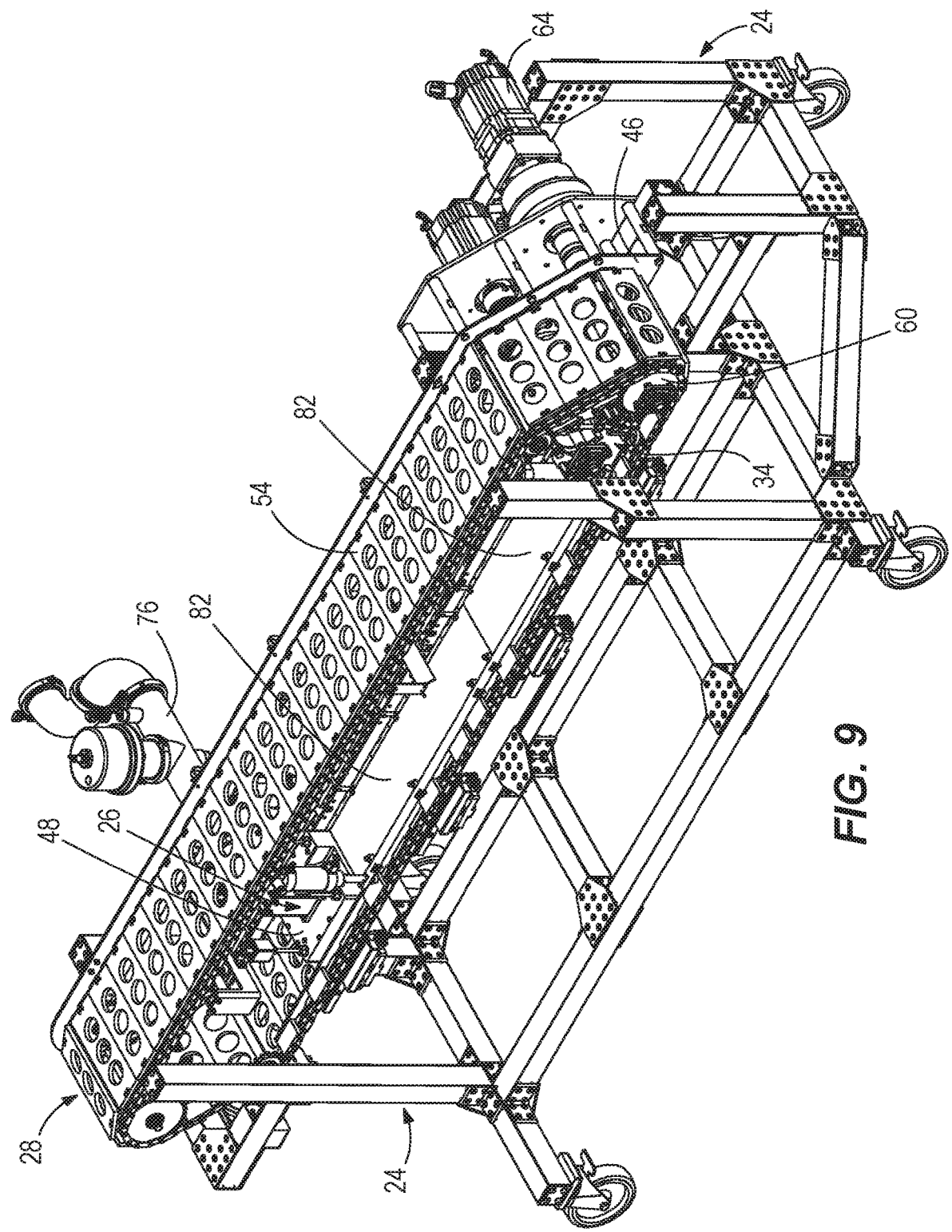
FIG. 9 depicts a perspective view of the patty forming machine with a hopper and pump assembly, a frame plate and ovens removed and shown from the top.

As best shown in FIG. 9, the patty molding and transport assembly 28 further includes at least one upper heater plate 82 fixedly connected to the upright frame plates 44, 46 (FIG. 9 does not show frame plate 44 and upper oven 30) and which is positioned directly above the lower run 68 of the mold plates 54, below the upper oven 30, downstream of the manifold 48 and upstream of the knockout mechanism 34. The at least one upper heater plate 82 has a planar lower surface which is in contact with the planar upper surfaces 54a of the mold plates 54 when the mold plates 54 are moving along the lower run 68. The at least one upper heater plate 82 spans the distance between the upright frame plates 44, 46 single upper heater plate 82, or multiple upper heater plates 82, may be provided.

Figure 10:
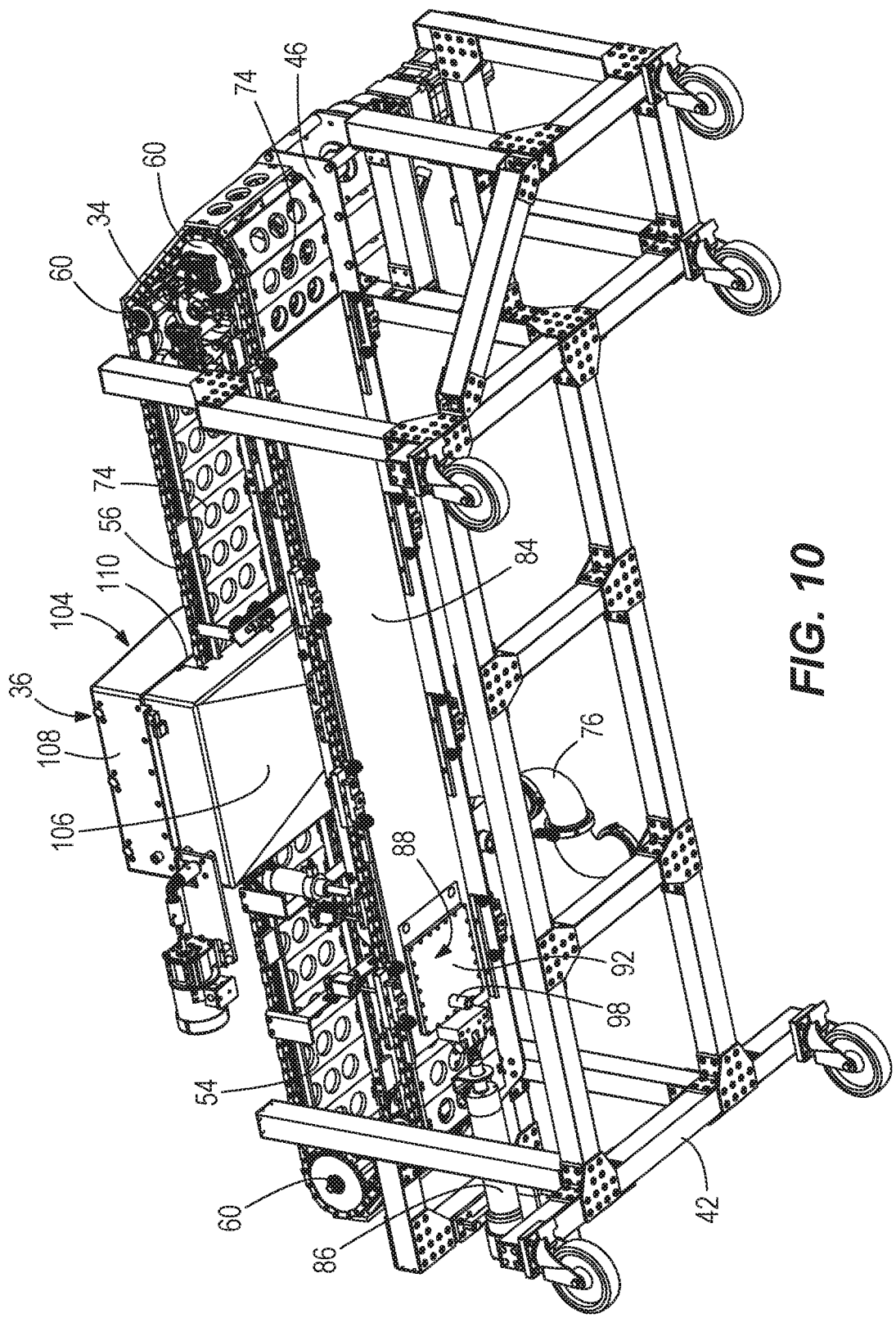
FIG. 10 depicts a perspective view of the patty forming machine with the hopper and pump assembly, the frame plate and ovens removed and shown from the bottom.
Figure 11:
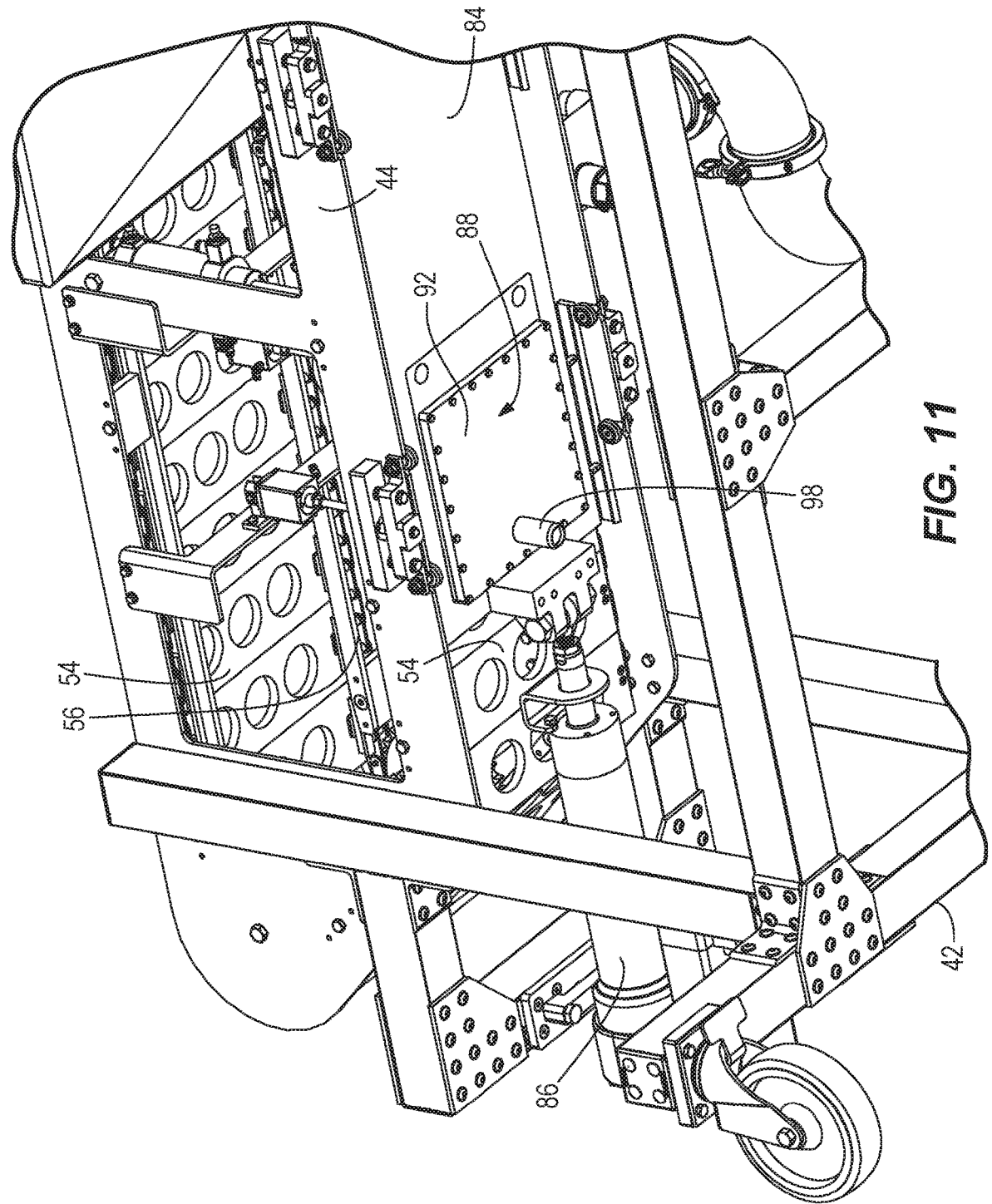
FIG. 11 depicts a partial perspective view of the patty forming machine with the hopper and pump assembly, the frame plate and ovens removed and shown from the bottom.
Figure 12:
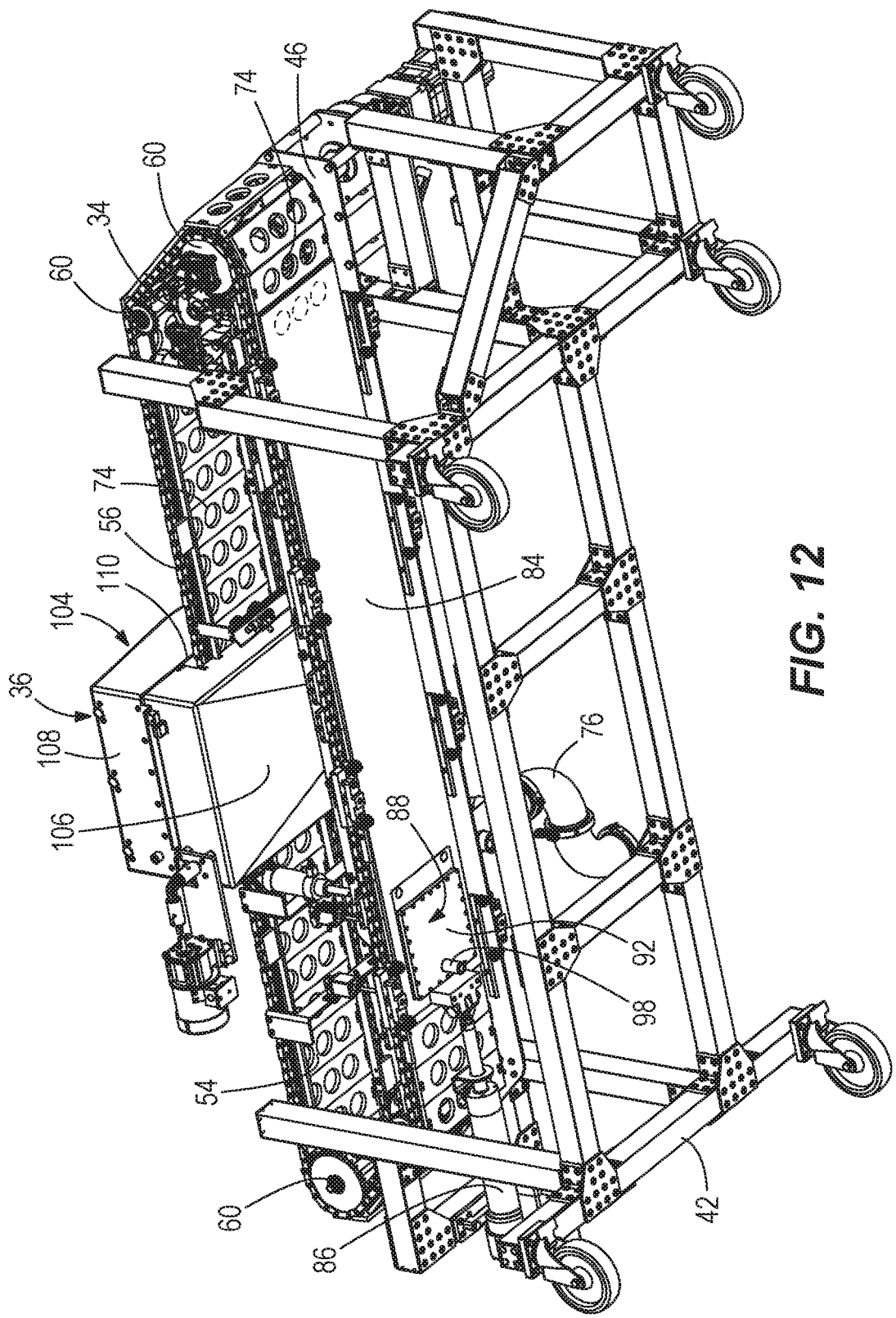
FIG. 12 depicts a perspective view of the patty forming machine with the hopper and pump assembly, the frame plate and ovens removed and shown from the bottom, and showing a lower heater plate in a moved position.

As best shown in FIGS. 10-12, the patty molding and transport assembly 28 further includes a lower heater plate 84 connected to the frame plates 44, 46 (FIGS. 10-12 do not show frame plate 44 and lower oven 32) and connected to the frame 24 by an actuator 86. The actuator 86 may be a servomotor, or may be a hydraulic piston having a piston rod attached to a forward end of the lower heater plate 84. Other actuators are within the scope of the disclosure. The lower heater plate 84 is positioned directly below the lower run 68 of the mold plates 54 and spans the distance between the upright frame plates 44, 46. The lower heater plate 84 has a planar upper surface which is in contact with the planar lower surfaces 54b of the mold plates 54 when the mold plates 54 are moving along the lower run 68. The lower heater plate 84 extends upstream of the manifold 48 and downstream of the manifold 48. The lower heater plate 84 can be reciprocated horizontally in the downstream and upstream directions of the lower run 66 under action of the actuator 86. In a first position, the lower heater plate 84 is extended such that the lower heater plate 84 is underneath the manifold 48 and underneath the knockout mechanism 34. In a second position, the lower heater plate 84 is retracted so that the lower heater plate 84 is underneath the manifold 48 but is not underneath the knockout mechanism 34. As such, lower ends of the mold cavities 74 in the mold plate 54 directly underneath the knockout mechanism 34 are exposed when the lower heater plate 84 is retracted.

Figure 13:
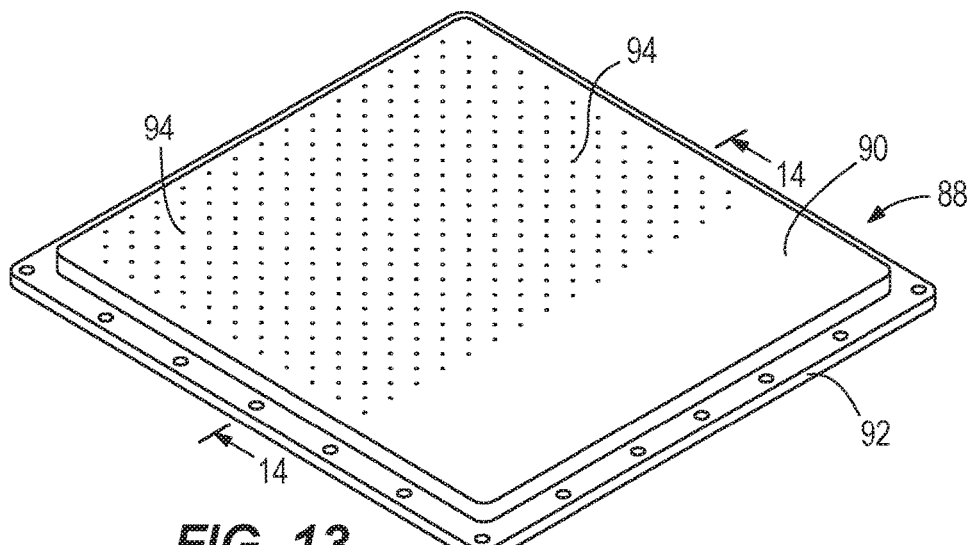
FIG. 13 depicts a perspective view of a breather plate assembly of the patty forming machine.
Figure 14:
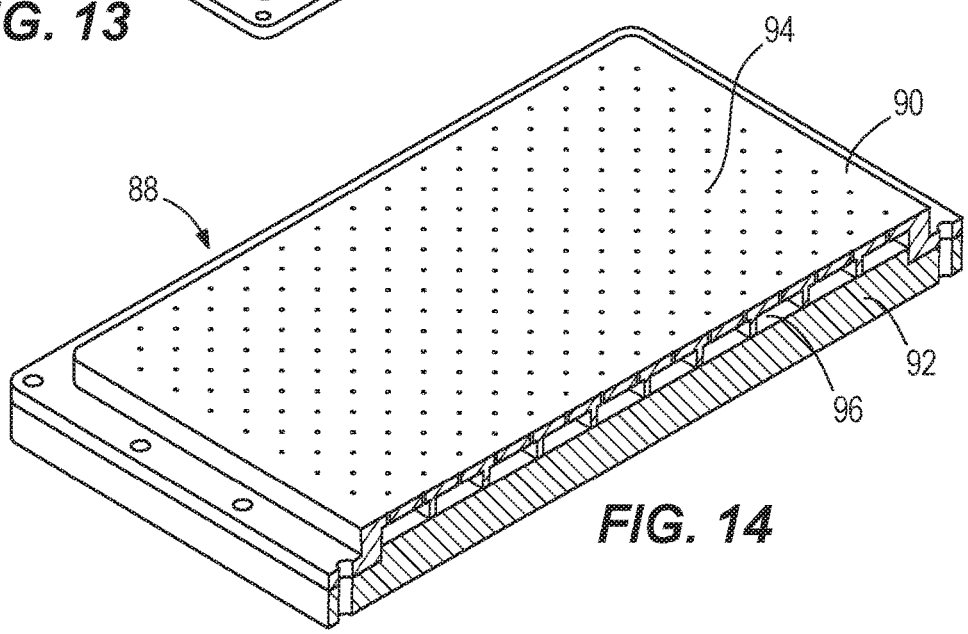
FIG. 14 depicts a cross-sectional view of the breather plate assembly shown in perspective.
Figure 15:
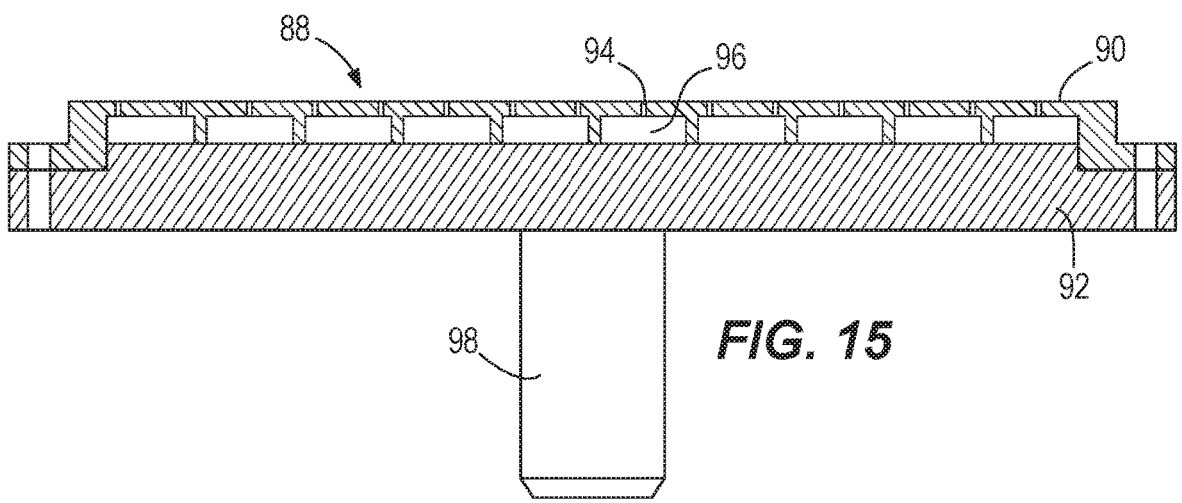
FIG. 15 depicts a cross-sectional view of the breather plate assembly.

The lower heater plate 84 has a breather plate assembly 88 attached thereto which is directly positioned below the manifold 48. As shown in FIGS. 13-15, the breather plate assembly 88 includes a breather plate 90 and a mounting plate 92 which is affixed to the lower heater plate 84. The breather plate 90 has a longitudinal length such that the breather plate 90 is always underneath the manifold 48 when the lower heater plate 84 is extended or is retracted. The breather plate 90 has a plurality of breather holes 94 which are flow connected to elongated air channels 96 in a lower surface of the breather plate 90. The air channels 96 are flow connected to an outlet conduit 98 which extends through the mounting plate 92. The breather holes 94, air channels 96 and conduit 98 allow for the expulsion of air during the filling of the mold cavities 74. The breather holes 94 are minute air outlet holes extending from a planar top surface of the breather plate 90 to the air channels 96. As the food material is pumped into the mold cavities 74, the food material displaces the air in the mold cavities 74. The air is forced outwardly through the breather holes 94, the air channels 96 and then the conduit 98. The conduit 98 may be connected to a conduit (not shown) which routes any food particles small enough to pass through the breather holes 94 back to the food pump system 40 or to the hopper 38. While the mounting plate 92 is shown as a separate component from the lower heater plate 84, the mounting plate 92 can be eliminated, with the breather plate 90 directly attached to the lower heater plate 84 and the lower heater plate 84 having the conduit 98 formed therein.

Figure 3:
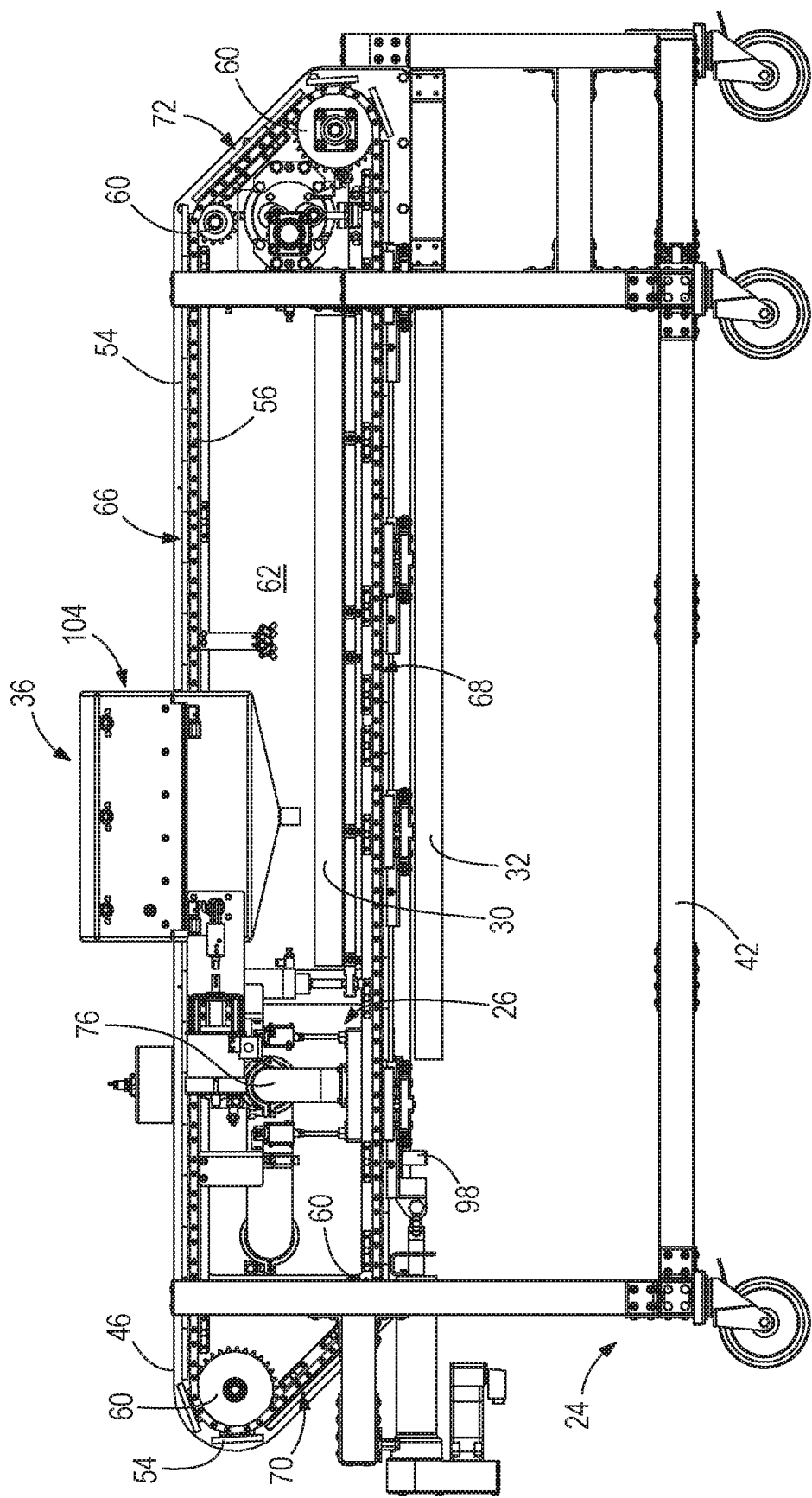
FIG. 3 depicts a side elevation view of the patty forming machine with a frame plate of a frame of the patty forming machine removed so that the internal components can be viewed.
Figure 4:
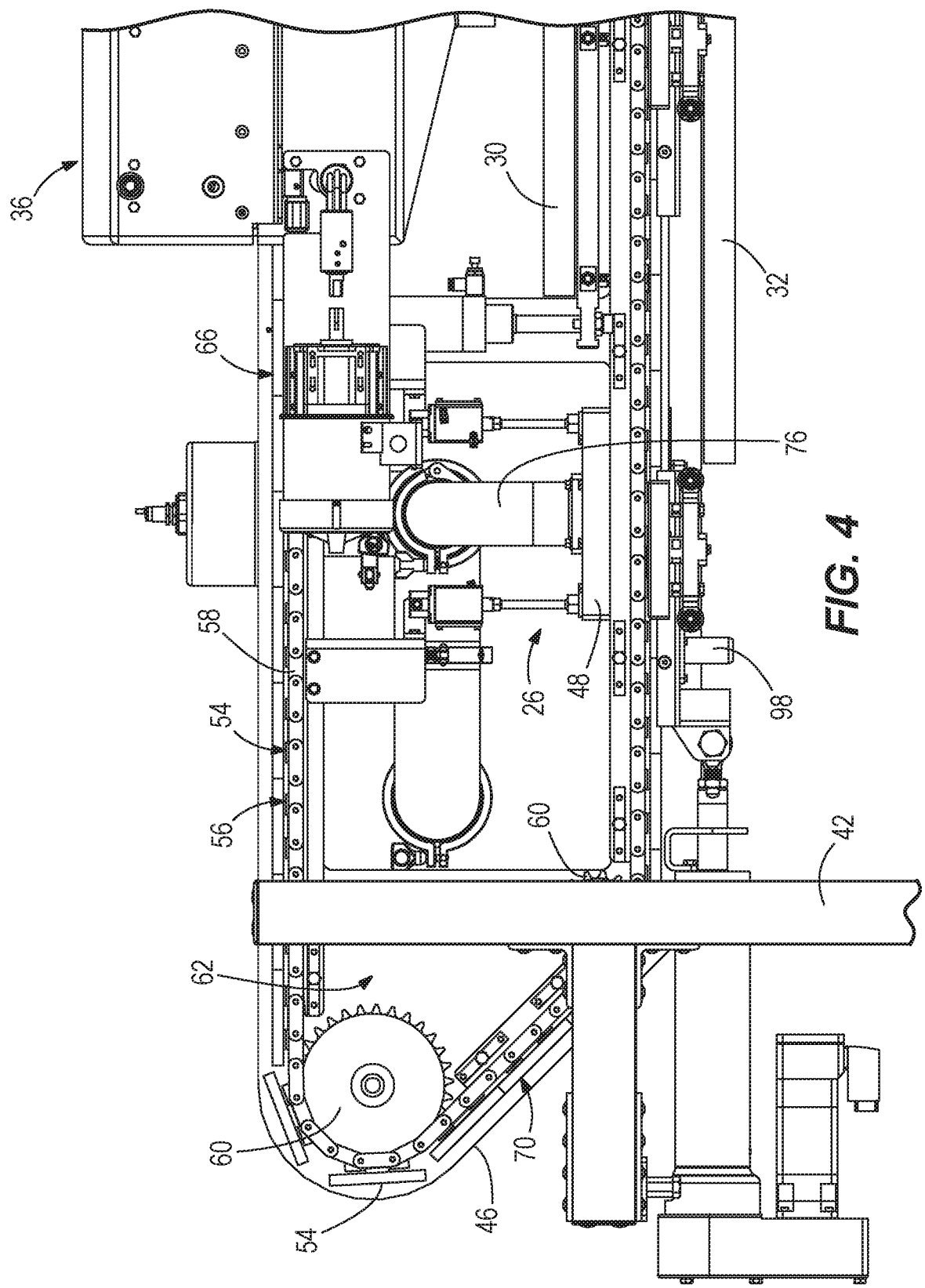
FIG. 4 depicts a partial side elevation view of the front end of the patty forming machine with the frame plate removed.

At least one upper oven 30, see FIG. 3, is attached to the frame plates 44, 46 and positioned within the cavity 62 downstream of the manifold 48, upstream of the knockout mechanism 34, and is positioned above the upper heater plate 82. The at least one upper oven 30 may be in direct contact with the upper heater plate 82 such that heat is readily transmitted through the upper heater plate 82 to the food material in the mold cavities 74. At least one lower oven 32, see FIG. 3, is attached to the frame plates 44, 46 and is positioned below the lower heater plate 84 downstream of the manifold 48 and upstream of the knockout mechanism 34. The at least one lower oven 32 may be in direct contact with the lower heater plate 84 such that heat is readily transmitted through the lower heater plate 84 to the food material in the mold cavities 74. The ovens 30, 32 may be formed as that which is disclosed in WO 2017/1511163 which is incorporated by reference to the extent not inconsistent with the description provided here.

In use, the food pump system 40 pumps food material from the hopper 38 to the manifold 48 and the food material is injected into the mold cavities 74 of the mold plate 54 directly below the manifold 48 in the lower run 68 to form a filled mold plate 54. During this filling, movement of the mold plates 54 may be continuous or may be stopped. In an embodiment, the food material provided in the hopper 38 has been preheated to a desired temperature by suitable means (not shown). The breather plate 90 below the manifold 48 substantially prevents the food material from passing therethrough (food particulates may pass through the breather plate 90 as discussed hereinabove). The gear 60 is driven to drive the endless belts 56 to move the next mold plate 54 underneath the manifold 48 so that food material can be injected into the mold cavities 74 of the next mold plate 54 to form a filled mold plate 54. This continues as the endless belts 56 are driven around the gears 60 to move the mold plates 54 along the runs 66, 70, 68, 72. The filled mold plate 54 translates along the length of the lower run 68 and passes between the lower heater plate 84 and the upper heater plate 82, and thus passes below the at least one upper oven 30 which is directly above the upper heater plate 82 and passes above the at least one lower oven 32 which is directly below the lower heater plate 84. Since lower heater plate 84 contacts the lower surfaces 54b of the mold plates 54, the food material in the mold cavities 74 is fully supported during transport from the manifold 48 to the knockout mechanism 34. The upper heater plate 82 may also provide some support for the food material during transport from the manifold 48 to the knockout mechanism 34. In addition, the upper heater plate 82 may shear excess food material deposited in the mold plate 54 above the upper surface of the mold plate 54 to keep the top surface of the food patties formed in the mold plates 54 uniform.

As the mold plates 54 pass by the ovens 30, 32, the food material is heated until skins are formed on upper and lower surfaces of the food material in the mold cavities 74 as disclosed in WO 2017/1511163, and heated food patties are formed. After the mold plates 54 passes by the ovens 30, 32, the mold plates 54 pass into the knockout mechanism 34. When one of the mold plates 54 is below the knockout plungers or cups 78, the actuator 86 is actuated to retract the lower heater plate 84 from underneath the knockout mechanism 34, and the knockout mechanism 34 is then actuated to knock the heated food patties out of the lower end of the mold cavities 74. The lower oven 32 may be upstream of the retracted position of the lower heater plate 84 so that the heat is consistently controlled. The heated food patties may be knocked out of the lower end of the mold cavities 74 onto a conveyor (not shown) for further processing, such as freezing and packaging.

In an embodiment, the mold cavities 74 in the mold plate 54 positioned directly below the manifold 48 are filled with food material at the same time that knockout occurs in the mold plate 54 positioned directly below the knockout mechanism 34. In an embodiment, the mold cavities 74 in the mold plate 54 positioned directly below the manifold 48 are filled with food material at a different time than when knockout occurs in the mold plate 54 positioned directly below the knockout mechanism 34.

Since the food material only needs to translate horizontally along the lower run 68, food material can be heated and knocked out in a faster manner than if the food material were to be injected into the mold cavities 74 along the upper run 66 since the food material does not need to travel as great of a distance. Also, since the food material does not traverse the either of the upright end runs 70, 72, the risk of the food material falling out of the mold cavities 74 is eliminated. In addition, the use of the retractable lower heater plate 84 allows for the mold cavities 74 to be open at both the upper and lower ends to allow for the knockout mechanism 34 to be used.

Figure 16:
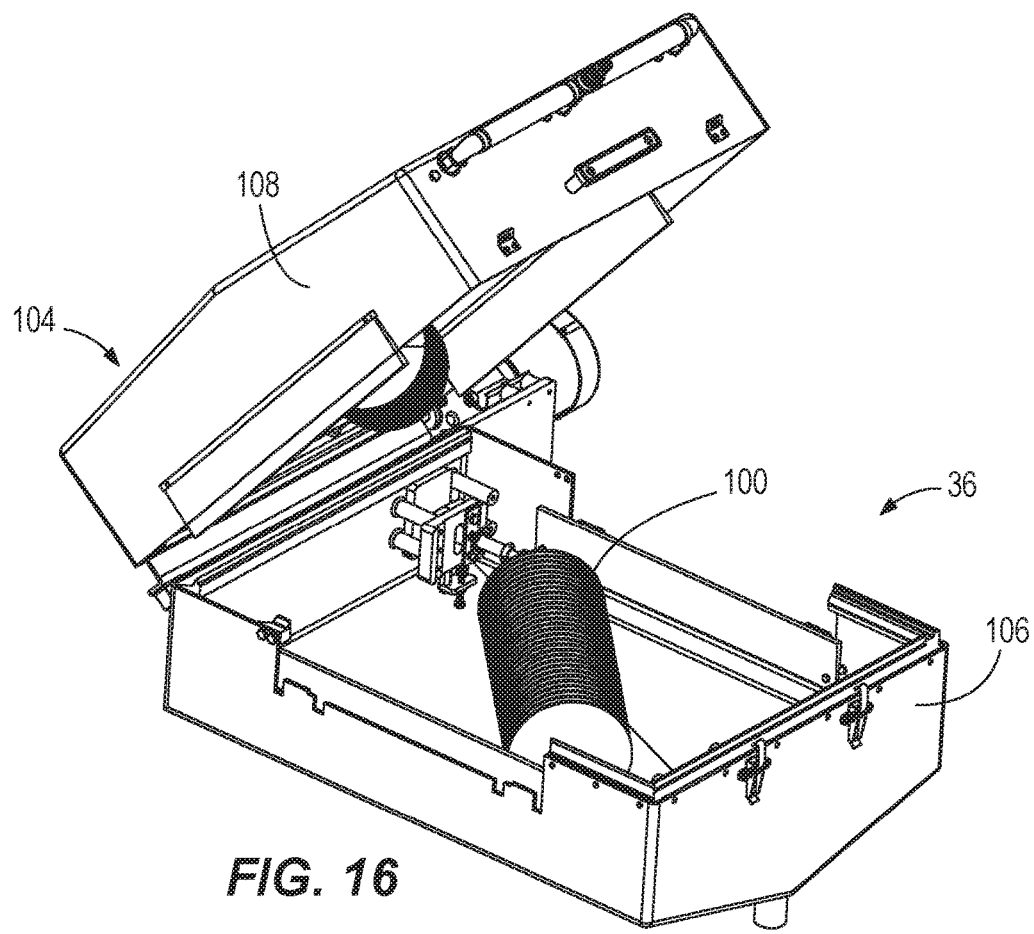
FIG. 16 depicts a perspective view of a wash station of the patty forming machine which is shown in an open position.
Figure 17:
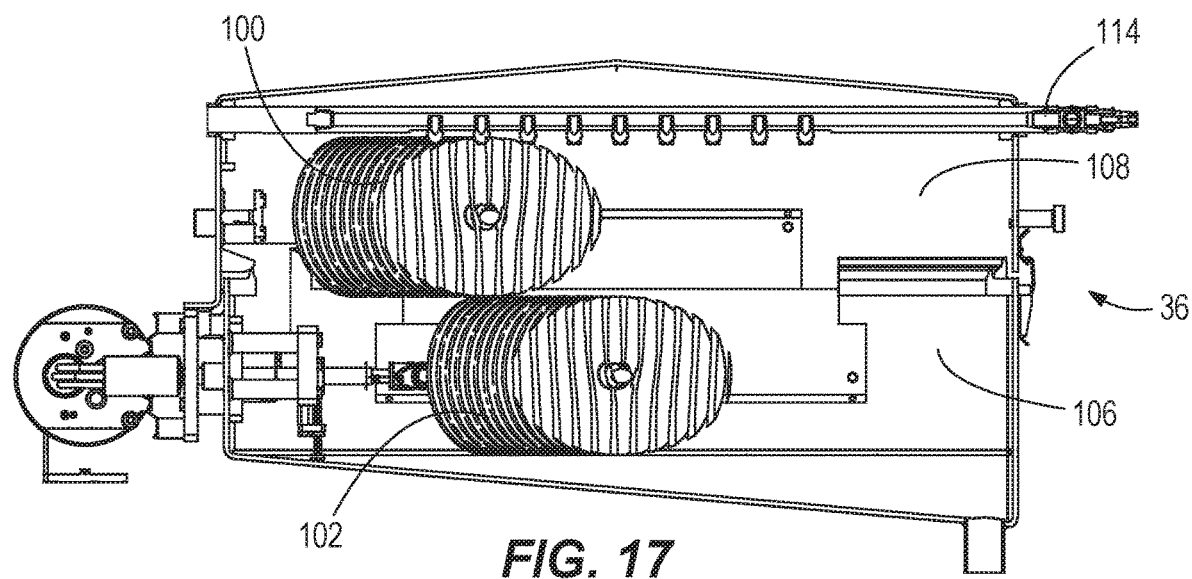
FIG. 17 depicts a cross-sectional view of the wash station.
Figure 18:
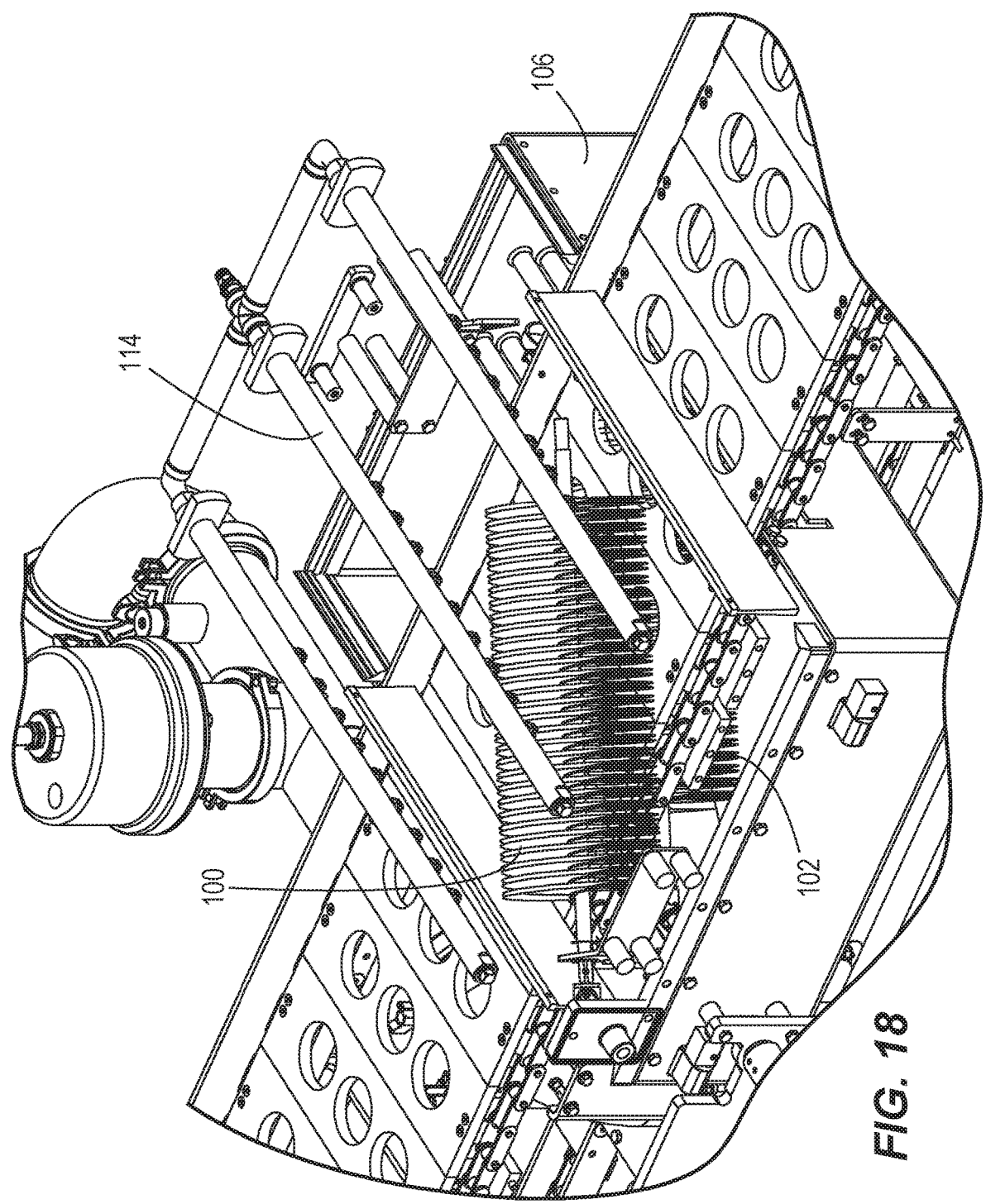
FIG. 18 depicts a perspective view of the wash station with a top portion of a housing of the wash station removed.

The wash station 36, see FIGS. 16-18, is mounted to the frame plates 44, 46 and is provided along the upper run 68. The wash station 36 has upper and lower driven brushes 100, 102 mounted in a housing 104 which scrub the upper and lower surfaces 54a, 54b of the mold plates 54 as the mold plates 54 pass through the housing 104. The housing 104 may be formed of a bottom portion 106 and a top portion 108 which are hingedly connected together. The upper brush 100 is in contact with the upper surface of each mold plate 54 as the mold plates 54 pass through the housing from a first opening 110 of the housing 104 to a second opening 112 of the housing 104. The lower brush 102 is in contact with the lower surface 54b of each mold plate 54 as the mold plates 54 pass through the housing 104 from the first opening 110 to the second opening 112. The brushes 100, 102 may be formed of Teflon® and may be cylindrical. The wash station 36 also supplies fluid to clean the mold plates 54 as the mold plates 54 pass through the housing 104. The fluids may be pumped into the wash station 36 above the brushes 100, 102 along a line 114 from a supply (not shown). A drain (not shown) is provided in the bottom of the housing 104 to allow fluid and debris removed from the mold plates 54 to pass outward of the housing 104. Sealing strips, such as Teflon® strips, may be provided along the openings 110, 112 and between the bottom and top portions 106, 108 to seal the housing 104, thereby preventing fluid and debris from exiting through the openings 110, 112 or the joints between the portions 106, 108. The wash station 36 may also have a dryer (not shown) which blows air onto the mold plates 54 to dry the mold plates 54.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A patty forming machine for forming heated food patties comprising:
    a frame;
    a plurality of mold plates connected together to form an endless loop and supported on the frame, the endless loop defining an endless loop enclosed cavity;
    the endless loop of connected mold plates having:
        a horizontal upper run of mold plates;
        a horizontal lower run of mold plates;
        a front end run of mold plates at a forward end of the endless loop, configured to couple together the horizontal upper run and horizontal lower run at the forward end; and
        a rear end run of mold plates at a rearward end of the endless loop, configured to couple together the horizontal upper run and horizontal lower run at the rearward end;
    wherein the plurality of mold plates are driven to circulate as the endless loop, each mold plate having at least one food product cavity therein which is open to an upper surface of the mold plate and open to a lower surface of the mold plate;
    a manifold provided in the endless loop enclosed cavity, wherein the manifold is above the lower run, the manifold configured to receive a supply of moldable food material and deliver the food material to the at least one food product cavity of the respective mold plates;
    an upper oven positioned within the endless loop enclosed cavity downstream of the manifold;
    a knockout mechanism mounted within the endless loop enclosed cavity downstream of the upper oven;
    a lower heater plate positioned below the lower run, the lower heater plate extending underneath the manifold and extending along a substantial portion of the lower run for supporting the food material in the mold plates traverse along the lower run; and
    a lower oven positioned below the lower heater plate downstream of the manifold, and upstream of the knockout mechanism.

2. The patty forming machine of claim 1, further comprising an upper heater plate positioned above the lower run and below the upper oven.

3. The patty forming machine of claim 1, further comprising a breather plate positioned below the lower run and below the manifold, the breather plate having a plurality of breather holes flow connected to air channels in a lower surface of the breather plate and an outlet conduit flow connected to the air channels.

4. The patty forming machine of claim 1, further comprising a wash station comprising a plurality of brushes for cleaning engaging upper and lower surfaces of the mold plates as the mold plates pass therethrough.

5. The patty forming machine of claim 4, wherein the wash station is provided on the upper run.

6. The patty forming machine of claim 1, wherein the lower heater plate can be moved to positioned to be completely upstream of the knockout mechanism and can be moved to be positioned underneath the knockout mechanism.

7. The patty forming machine of claim 1, wherein the lower heater plate is configured to reciprocated along the lower run by an actuator such that the lower heater plate can be moved to positioned to be completely upstream of the knockout mechanism, and can be moved to be positioned underneath the knockout mechanism.

8. The patty forming machine of claim 7, wherein the lower heater plate includes a breather plate having a plurality of breather holes flow connected to air channels in a lower surface of the breather plate and an outlet conduit flow connected to the air channels, wherein the breather plate moves with the lower heater plate.

9. A patty forming machine for forming heated food patties comprising:
- a frame;
- a plurality of mold plates connected together to form an endless loop and supported on the frame, the endless loop defining an endless loop enclosed cavity;
- the endless loop of connected mold plates having:
  - a horizontal upper run of mold plates;
  - a horizontal lower run of mold plates;
  - a front end run of mold plates at a forward end of the endless loop, configured to couple together the horizontal upper run and horizontal lower run; and
  - a rear end run of mold plates at a rearward end of the endless loop, configured to couple together the horizontal upper run and horizontal lower run;
- wherein the plurality of mold plates are driven to circulate as the endless loop, each mold plate having at least one food product cavity therein which is open to an upper surface of the mold plate and open to a lower surface of the mold plate;
- a manifold provided in the endless loop enclosed cavity, wherein the manifold is above the lower run, the manifold configured to receive a supply of moldable food material and deliver the food material to the mold plates;
- an upper oven positioned within the endless loop enclosed cavity downstream of the manifold;
- a lower oven positioned below the lower run downstream of the manifold; and
- a wash station comprising a plurality of brushes for cleaning the upper and lower surfaces of the mold plates as the mold plates pass therethrough.

10. The patty forming machine of claim 9, wherein the wash station is provided on the upper run.

11. The patty forming machine of claim 9, wherein the brushes are driven for rotation.

12. The patty forming machine of claim 9, further comprising a supply of fluid connected to the wash station for cleaning the mold plates as the mold plates pass therethrough.

13. The patty forming machine of claim 9, further comprising a knockout mechanism mounted within the endless loop enclosed cavity downstream of the upper oven.

14. A patty forming machine for forming heated food patties comprising:
- a frame;
- a plurality of mold plates connected together to form an endless loop and supported on the frame, the endless loop defining an endless loop enclosed cavity;
- the endless loop of connected mold plates defined by:
  - a horizontal upper run of mold plates;
  - a horizontal lower run of mold plates;
  - a front end run of mold plates at a forward end of the endless loop, configured to couple together the horizontal upper run and horizontal lower run; and
  - a rear end run of mold plates at a rearward end of the endless loop, configured to couple together the horizontal upper run and horizontal lower run;
- wherein the plurality of mold plates are driven to circulate as the endless loop, each mold plate having at least one food product cavity therein which is open to an upper surface of the mold plate and open to a lower surface of the mold plate;
- a manifold provided in the endless loop enclosed cavity, wherein the manifold is above the lower run, the manifold configured to receive a supply of moldable food material and deliver the food material to the mold plates;
- an upper oven positioned within the endless loop enclosed cavity downstream of the manifold;
- a lower oven positioned below the lower run downstream of the manifold; and
- a breather plate positioned below the lower run and below the manifold, the breather plate having a plurality of breather holes flow connected to air channels in a lower surface of the breather plate and an outlet conduit flow connected to the air channels.

* * * * *